United States Patent
Melchin et al.

(10) Patent No.: US 12,134,692 B2
(45) Date of Patent: Nov. 5, 2024

(54) CROSSLINKABLE POLYMER-POWDER COMPOSITIONS REDISPERSIBLE IN WATER

(71) Applicant: Wacker Chemie AG, Munich (DE)

(72) Inventors: Timo Melchin, Mehring (DE); Ulf Dietrich, Burghausen (DE); Heimo Wölfle, Traunstein (DE)

(73) Assignee: Wacker Chemie AG, Munich (DE)

( * ) Notice: Subject to any disclaimer, the term of this patent is extended or adjusted under 35 U.S.C. 154(b) by 625 days.

(21) Appl. No.: 17/433,785

(22) PCT Filed: Feb. 26, 2019

(86) PCT No.: PCT/EP2019/054693
§ 371 (c)(1),
(2) Date: Aug. 25, 2021

(87) PCT Pub. No.: WO2020/173547
PCT Pub. Date: Sep. 3, 2020

(65) Prior Publication Data
US 2022/0135784 A1   May 5, 2022

(51) Int. Cl.
| | |
|---|---|
| *C08L 31/04* | (2006.01) |
| *C04B 24/26* | (2006.01) |
| *C04B 24/28* | (2006.01) |
| *C04B 26/04* | (2006.01) |
| *C04B 26/14* | (2006.01) |
| *C08J 5/18* | (2006.01) |
| *C08L 63/00* | (2006.01) |

(52) U.S. Cl.
CPC .......... *C08L 31/04* (2013.01); *C04B 24/2623* (2013.01); *C04B 24/281* (2013.01); *C04B 26/045* (2013.01); *C04B 26/14* (2013.01); *C08J 5/18* (2013.01); *C08L 63/00* (2013.01); *C08J 2331/04* (2013.01); *C08J 2463/00* (2013.01); *C08L 2201/54* (2013.01); *C08L 2312/00* (2013.01)

(58) Field of Classification Search
CPC .... C08L 63/00–10; C08L 31/02; C08L 31/04; C09D 163/00–10; C09D 131/02; C09D 131/04; C09J 163/00–10; C09J 131/02; C09J 131/04; C09J 2431/02; C09J 2431/04; C08J 2363/00–10; C08J 2463/00–10; C08J 3/122; C08J 2331/02; C08J 2331/04; C08J 2431/02; C08J 2431/04; C04B 24/2623; C04B 24/281
See application file for complete search history.

(56) References Cited

U.S. PATENT DOCUMENTS

| | | | |
|---|---|---|---|
| 4,009,224 A | 2/1977 | Warnken | |
| 4,028,294 A | 6/1977 | Brown et al. | |
| 4,108,819 A | 8/1978 | Oyamada et al. | |
| 4,690,988 A | 9/1987 | Hoffman et al. | |
| 5,993,769 A * | 11/1999 | Pinnavaia | C01B 33/44 423/327.1 |
| 6,235,811 B1 | 5/2001 | Robeson et al. | |
| 2001/0024644 A1 | 9/2001 | Kohlhammer et al. | |
| 2010/0197831 A1* | 8/2010 | Faatz | C04B 24/2688 523/401 |
| 2012/0329909 A1* | 12/2012 | Kuehn | C08J 3/122 523/401 |

FOREIGN PATENT DOCUMENTS

| | | |
|---|---|---|
| CN | 108249880 A | 7/2018 |
| DE | 2601200 A1 | 7/1976 |
| DE | 10004319 A1 | 8/2001 |
| EP | 0723975 B1 | 5/1999 |
| EP | 0896029 B1 | 5/2000 |
| EP | 0721004 B1 | 3/2001 |
| WO | 10086217 A3 | 12/2010 |
| WO | 18220133 A1 | 12/2018 |

OTHER PUBLICATIONS

Fox T. G., Bull. Am. Physics Soc. 1, 3, p. 123 (1956).

* cited by examiner

*Primary Examiner* — Kregg T Brooks

(57) ABSTRACT

A crosslinkable polymer powder compositions redispersible in water includes one or more vinyl ester polymers, one or more compounds bearing epoxide groups and optionally one or more curing agents which crosslink with the compounds bearing epoxide groups. The vinyl ester polymers do not comprise any epoxide-functional monomer units. The crosslinkable polymer powder compositions redispersible in water includes ≥51% by weight, based on the total weight of the vinyl ester polymers, of one or more compounds bearing epoxide groups.

20 Claims, No Drawings

CROSSLINKABLE POLYMER-POWDER COMPOSITIONS REDISPERSIBLE IN WATER

CROSS-REFERENCE TO RELATED APPLICATION

This application is a U.S. National Phase Application of PCT/EP2019/054693, filed Feb. 26, 2019, the contents of which is hereby incorporated by reference in its entirety.

BACKGROUND

The invention relates to crosslinkable polymer powder compositions redispersible in water comprising polymers and epoxide compounds, to processes for the production thereof and use thereof, in particular in coatings or adhesives, for example for the construction sector.

Polymer powders (dispersion powders) redispersible in water are generally obtained by drying aqueous polymer dispersions. The drying is often carried out in the presence of drying aids, generally protective colloids, as a result of which a coating of drying aids can form around the polymer particles. During the drying process, drying aids can prevent the polymer particles from adhering irreversibly together. When dispersion powders are dispersed in water, the drying aid matrix redissolves, so that the polymer particles are released again in the aqueous dispersion and are present therein with the particle size of the starting dispersion.

Dispersion powders of this type are used in a wide variety of applications, for example in coatings or adhesives, in particular in construction chemical products such as tile adhesives, spackling compounds, leveling compounds, thermal insulation composite systems or jointing mortars. It is advantageous that dispersion powder can be provided in ready-made, storable dry mixtures, optionally together with hydraulic binders such as cement, which are only converted into the ready-to-use mixture by adding water immediately before use. Such dry mixtures can be transported (without water content) with less effort compared to paste-like systems and do not require the addition of preservatives during storage.

The mechanical strength and adhesion of the construction chemical products thus modified can be improved with dispersion powders. To further increase the mechanical strength, crosslinking additives can also be used.

Aqueous polymer dispersions modified with epoxy resin are known from a series of publications. Such systems tend to crosslink prematurely or suffer other, undesired chemical reactions and therefore no longer have the necessary ability to crosslink during application. For example, U.S. Pat. No. 4,028,294 describes an emulsion polymerization of ethylenically unsaturated monomers in the presence of epoxy resin, in which functional comonomers bearing groups which crosslink with the epoxy resin are polymerized in order to obtain crosslinkable systems. According to U.S. Pat. No. 4,028,294, no premature crosslinking occurs at the temperatures selected for the polymerization. The production of polymer powder compositions dispersible in water is not described. U.S. Pat. No. 4,108,819 describes the copolymerization of vinyl acetate and ethylene in the presence of an epoxy resin. Polymerization takes place at pH 3 to 7 to prevent premature crosslinking. An amino curing agent is then added to the dispersion. A disadvantage of these processes is the risk of premature crosslinking, since both epoxide groups and amino curing agents are present in the aqueous dispersion and therefore usually at least partially crosslink during storage. Analogous dispersions are also known from DE 2601200. U.S. Pat. No. 6,235,811 B1 also describes aqueous, crosslinkable polymer dispersions comprising vinyl acetate (co)polymer latex, epoxy resin and isophoronediamine. Here, too, epoxy resin and amine crosslinker are present side by side in the liquid phase, which leads to premature crosslinking on storage. U.S. Pat. No. 4,690,988 describes the production of polymer-modified, vinylized epoxy resins by first reacting a polyepoxide with an ethylenically unsaturated carboxylic acid and then polymerizing further monomers in the presence of the vinylized epoxy resin (vinyl-functional chain-extending monomers). The polymers obtained in this way are crosslinked by adding (hydro)peroxides. It is difficult to eliminate premature crosslinking in such systems. Polymer powders redispersible in water are not described in any of these documents.

According to US 2001/0024644, a crosslinkable dispersion powder is obtained by copolymerization of ethylenically unsaturated monomers and epoxide-functional monomers in an aqueous medium, subsequent drying of the dispersion and then addition of polyepoxide. The disadvantage is that the crosslinking efficiency is relatively low here. In addition, the dispersion powders comprise only small amounts of polyepoxide at 1 to 50% by weight, in particular 1 to 15% by weight, based on the total weight of copolymers and polyepoxide. EP 0896029 A1 describes a copolymerization of ethylenically unsaturated monomers with crosslinkable comonomers, drying of the dispersion and subsequent addition of solid particles which can crosslink with the crosslinkable groups of the copolymer via functional groups. EP-A 723975 A1 discloses a dispersion powder which is obtained by copolymerizing styrene and/or (meth)acrylic esters with epoxide-functional comonomers. A disadvantage of these processes is the risk of premature crosslinking during the polymerization in the presence of crosslinkable comonomers. EP 721004 A2 discloses polymer powder compositions comprising polymer powder and a wide variety of pulverulent crosslinking components, which are obtained by applying the respective liquids to a pulverulent carrier. The pulverulent components are then mixed with one another. The disadvantage here is the handling of such a 3-component system and the lack of redispersibility of such mixtures. WO2010/086217 describes crosslinkable polymer powder compositions redispersible in water comprising epoxy resin and base polymers. The focus of the base polymers is on styrene acrylates. The proportion of epoxy resins in the polymer powder compositions is 1 to 50% by weight, in particular 5 to 30% by weight, based on the base polymers. WO2018/220133 discloses compositions comprising at least 10% by weight cement, compounds bearing epoxide groups, polymers, particularly styrene acrylates, fillers and optionally additives. The compounds bearing epoxide groups and the polymers may also be provided in the form of premixes, in which, however, a greater proportion by weight of polymers than epoxide compounds is present.

Against this background, the object was to provide crosslinkable polymer compositions redispersible in water having a high content of compounds bearing epoxide groups, which should have high reactivity and at the same time good storage stability; in particular, premature crosslinking should be excluded as far as possible during the production and storage of the polymer compositions. Such polymer compositions, when used in construction chemical products, should preferably result in water-resistant films even without addition of mineral binders. High contents of compounds bearing epoxide groups combined with high reactivity and good storage stability represent extreme and mutually contradicting requirements.

Surprisingly, this object has been achieved with crosslinkable polymer powder compositions comprising high amounts of compounds bearing epoxide groups in combination with vinyl ester polymers according to the invention.

BRIEF SUMMARY

Embodiments of a crosslinkable polymer powder composition redispersible in water are provided. In an embodiment, the crosslinkable polymer powder composition comprises one or more protective colloid-stabilized vinyl ester polymers, one or more compounds bearing epoxide groups, and optionally one or more curing agents which crosslink with the compounds bearing epoxide groups. The vinyl ester polymers do not comprise any epoxide-functional monomer units. The crosslinkable polymer powder composition redispersible in water comprises ≥51% by weight, based on the total weight of the vinyl ester polymers, of one or more compounds bearing epoxide groups.

DETAILED DESCRIPTION

The invention relates to crosslinkable polymer powder compositions redispersible in water (crosslinkable polymer powder compositions) comprising
one or more vinyl ester polymers,
one or more compounds bearing epoxide groups (epoxide compounds) and
optionally one or more curing agents which crosslink with the epoxide compounds, wherein the vinyl ester polymers do not comprise any epoxide-functional monomer units, and
the crosslinkable polymer powder compositions comprise ≥51% by weight, based on the total weight of the vinyl ester polymers, of one or more epoxide compounds.

Epoxide compounds are generally understood to mean non-free radically polymerizable epoxide compounds having at least two epoxide groups per molecule. The epoxide compounds may be aliphatic, cycloaliphatic or aromatic in nature.

Preferred epoxide compounds are epoxy resins. An example of these are epoxide compounds of the bisphenol A type, that is to say condensation products of bisphenol A and epichlorohydrin or methylepichlorohydrin. Also suitable are epoxy resins based on bisphenol F, which generally comprise a mixture of bisglycidyloxyphenylmethanes. Further examples are aliphatic epoxide compounds such as glycidyl ethers of aliphatic polyols, in particular butyl diglycidyl ether; cycloaliphatic epoxy resins such as vinylcyclohexane dioxide, dicyclopentadiene dioxide and 3,4-epoxy-6-methylcyclohexylmethyl; and heterocyclic epoxide compounds such as triglycidyl isocyanurate. Such epoxy resins are commercially available, for example the bisphenol A and bisphenol F types as Epilox® resins.

Particular preference is given to the epoxy resins of the bisphenol A type and bisphenol F type or mixtures thereof.

Examples of further epoxide compounds are bisglycidyloxyphenylmethane, butyl diglycidyl ether, vinylcyclohexane dioxide, dicyclopentadiene dioxide, 3,4-epoxy-6-methyl-cyclohexylmethyl and triglycidyl isocyanurate.

The epoxide compounds are present in the crosslinkable polymer powder compositions to an extent of preferably ≥80% by weight, particularly preferably ≥100% by weight and most preferably ≥120% by weight, based on the total weight of the vinyl ester polymers or based on the total weight of the vinyl ester polymers and the further polymers. The epoxide compounds are present in the crosslinkable polymer powder compositions to an extent of preferably 51% to 300% by weight, particularly preferably 80% to 200% by weight and most preferably 120% to 180% by weight, based in each case on the total weight of the vinyl ester polymers or based on the total weight of the vinyl ester polymers and the further polymers.

The epoxide compounds are present in the crosslinkable polymer powder compositions to an extent of preferably 20% to 75% by weight, particularly preferably 35% to 65% by weight and most preferably 40% to 60% by weight, based in each case on the total weight of the crosslinkable polymer powder compositions.

The vinyl ester polymers are preferably based on one or more vinyl esters of unbranched or branched alkylcarboxylic acids having 1 to 15 carbon atoms and optionally one or more monomers selected from the group comprising methacrylic esters and acrylic esters of alcohols having 1 to 15 carbon atoms, vinyl aromatics, olefins, dienes and vinyl halides, in which the vinyl ester polymers do not comprise any epoxide-functional monomer units.

The vinyl ester polymers are generally obtainable by means of free-radically initiated polymerization in aqueous medium of one or more vinyl esters and optionally one or more further monomers, in which no epoxide-functional monomers are copolymerized.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 carbon atoms (vinyl versatate), for example VeoVa9® or VeoVa10® (trade names of Resolution). Particular preference is given to vinyl acetate.

Vinyl ester polymers are preferably based on vinyl esters to an extent of ≥50% by weight, more preferably ≥60% by weight and particularly preferably ≥75% by weight, based on the total weight of the vinyl ester polymers.

Examples of olefins and dienes are ethylene, propylene, and 1,3-butadiene. A suitable vinyl halide is vinyl chloride.

Preferred methacrylic esters or acrylic esters are methyl acrylate, methyl methacrylate, ethyl acrylate, ethyl methacrylate, propyl acrylate, propyl methacrylate, butyl acrylate (n-, iso-, tert-), n-butyl methacrylate, 2-ethylhexyl acrylate, norbornyl acrylate. Particular preference is given to methyl acrylate, methyl methacrylate, butyl acrylate and 2-ethylhexyl acrylate.

The vinyl ester polymers are preferably based on methacrylic esters or acrylic esters to an extent of ≤50% by weight, more preferably ≤35% by weight and particularly preferably ≤25% by weight, based on the total weight of the vinyl ester polymers. Most preferably, the vinyl ester polymers do not comprise any monomer units of methacrylic esters and acrylic esters.

Suitable vinyl aromatic compounds are styrene and vinyltoluene. The vinyl ester polymers are preferably based on vinyl aromatics, especially styrene, to an extent of ≤50% by weight, more preferably ≤30% by weight and particularly preferably ≤20% by weight, based on the total weight of the vinyl ester polymers. Most preferably, the vinyl ester polymers do not comprise any monomer units of vinyl aromatics, in particular no monomer units of styrene.

The vinyl ester polymers do not comprise any epoxide-functional monomer units. The vinyl ester polymers preferably do not bear any epoxide groups. The vinyl ester polymers preferably do not comprise any units of glycidyl acrylate, glycidyl methacrylate, allyl glycidyl ether or vinyl glycidyl ether. The vinyl ester polymers particularly preferably do not comprise any units of glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyl toluenes substituted with glycidyl radicals in the aromatic ring and vinyl benzoates substituted with glycidyl radicals in the aromatic ring.

It is optionally also possible to copolymerize auxiliary monomers to an extent of up to 10% by weight, preferably 0.05% to <2% by weight, particularly preferably 0.05% to 1% by weight, based in each case on the total weight of the vinyl ester polymers. Most preferably, no auxiliary monomers, in particular no ethylenically unsaturated mono- or dicarboxylic acids, are copolymerized.

Examples of auxiliary monomers are ethylenically unsaturated mono- and dicarboxylic acids, ethylenically unsaturated carboxamides and carbonitriles, mono- and diesters of fumaric acid and maleic acid, and also maleic anhydride, ethylenically unsaturated sulfonic acids such as vinylsulfonic acid, 2-acrylamido-2-methyl-propanesulfonic acid. Further examples are precrosslinking comonomers such as polyethylenically-unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide (NMMA), N-methylol allylcarbamate, alkyl ethers such as the isobutoxy ether or esters of N-methylolacrylamide, of N-methylolmethacrylamide and of N-methylol allylcarbamate. Further examples are silicon-functional comonomers, such as acryloxypropyltri(alkoxy)silanes and methacryloxypropyltri(alkoxy)silanes, vinyltrialkoxysilanes and vinylmethyldialkoxysilanes.

The vinyl ester polymers may be vinyl ester homopolymers or vinyl ester copolymers. Examples of suitable vinyl ester polymers are polymers which are obtained by polymerizing vinyl acetate, copolymerizing vinyl acetate with ethylene, copolymerizing vinyl acetate with ethylene and one or more further vinyl esters such as vinyl versatate or vinyl laurate, copolymerizing one or more vinyl esters such as vinyl acetate and vinyl laurate, vinyl chloride and ethylene, and by copolymerizing vinyl acetate with ethylene and one or more acrylic esters, it being optionally possible in each case for auxiliary monomers also to be copolymerized.

Particular preference is given to homopolymers of vinyl acetate; copolymers of vinyl acetate with 1% to 40% by weight ethylene; copolymers of vinyl acetate with 1% to 40% by weight ethylene and 1 to 50% by weight of one or more further comonomers from the group of vinyl esters having 1 to 12 carbon atoms in the carboxylic acid radical such as vinyl propionate, vinyl laurate, vinyl esters of alpha-branched carboxylic acids having 9 to 13 carbon atoms (vinyl versatates) such as VeoVa9®, VeoVa10®, VeoVa11®; copolymers of vinyl acetate, 1% to 40% by weight ethylene and preferably 1% to 60% by weight (meth)acrylic esters of unbranched or branched alcohols having 1 to 15 carbon atoms, in particular butyl acrylate or 2-ethylhexyl acrylate; and copolymers with 30% to 75% by weight vinyl acetate, 1 to 30% by weight vinyl laurate or vinyl esters of an alpha-branched carboxylic acid having 9 to 13 carbon atoms, and 1% to 30% by weight (meth)acrylic esters of unbranched or branched alcohols having 1 to 15 carbon atoms, in particular methyl methacrylate, butyl acrylate or 2-ethylhexyl acrylate, which also comprise 1% to 40% by weight ethylene; copolymers with vinyl acetate and/or one or more further comonomers from the group of vinyl esters having 1 to 12 carbon atoms in the carboxylic acid radical, and 1% to 40% by weight ethylene and 1% to 60% by weight vinyl chloride; where the polymers may each also comprise the auxiliary monomers specified in the amounts specified, and the figures in % by weight add up to 100% by weight in each case.

Most preferred vinyl ester polymers are homopolymers of vinyl acetate and, in particular, copolymers consisting of vinyl acetate and ethylene units. Vinyl acetate-ethylene copolymers are based on ethylene preferably to an extent of 1% to 30% by weight, particularly preferably 5% to 20% by weight and most preferably 8% to 15% by weight, based on the total weight of the vinyl acetate-ethylene copolymers.

The vinyl ester polymers are present in the crosslinkable polymer powder compositions to an extent of preferably 15% to 75% by weight, particularly preferably 20% to 50% by weight and most preferably 25% to 40% by weight, based in each case on the total weight of the crosslinkable polymer powder compositions.

In addition to the vinyl ester polymers, the crosslinkable polymer powder compositions may comprise one or more further polymers based on ethylenically unsaturated monomers. The further polymers generally do not comprise any vinyl ester units, in particular comprise no vinyl acetate unit, and preferably no epoxide-functional monomer units.

The further polymers are preferably based on one or more monomers selected from the group comprising methacrylic esters and acrylic esters of alcohols having 1 to 15 carbon atoms, vinyl aromatics, olefins, dienes and vinyl halides. The monomers mentioned can, for example, assume the embodiments mentioned above.

The vinyl ester polymers are present in the crosslinkable polymer powder compositions to an extent of preferably ≥50% by weight, more preferably ≥70% by weight and particularly preferably ≥90% by weight, based in each case on the total weight of the vinyl ester polymers and further polymers present in the crosslinkable polymer powder compositions. Most preferably, no further polymers are present.

The monomers or the proportions by weight of the comonomers are selected which, in general, result in a glass transition temperature Tg of −50° C. to +50° C., preferably −20° C. to +45° C., more preferably −10° C. to +40° C., even more preferably 0° C. to +40° C. and particularly preferably 10° C. to +40° C. The glass transition temperature Tg of the polymers may be determined in a known manner by DSC (Differential Scanning calorimetry, DIN EN ISO 11357-1/2), for example using the DSC1 differential scanning calorimeter from Mettler-Toledo, in an open crucible at a heating rate of 10 K/min. The temperature at the midpoint of the step (midpoint=half the step height of the heat flow step) of the second heating curve is evaluated as the glass transition temperature in the plot of heat flow. The Tg for the vinyl ester polymers and for the further polymers may also be approximately calculated in advance using the Fox equation. According to Fox T. G., Bull. Am. Physics Soc. 1, 3, page 123 (1956): $1/Tg=x_1/Tg_1+x_2/Tg_2+ \ldots x_n/Tg_n$, where $x_n$ is the mass fraction (% by weight/100) of the monomer n, and $Tg_n$ is the glass transition temperature in Kelvin of the homopolymer of the monomer n. Tg values for homopolymers are listed in Polymer Handbook 2nd Edition, J. Wiley & Sons, New York (1975).

Suitable curing agents (hardeners) crosslinking with the epoxide compounds are, for example, those which crosslink with the epoxide compounds at the processing temperature of construction chemical products, generally the ambient temperature, generally at temperatures between 0° C. and 40° C. Preference is given to amines which crosslink with the epoxide compounds. Particularly preferred amines are those having two or more amino groups, for example aliphatic polyamines, polyoxyalkyleneamines, polyethyleneimines, aminosilanes and condensation products thereof, amino-functional polyvinyl alcohols or isophoronediamines. Most preferred are aliphatic polyamines, which are available, for example, under the trade name Anquamine® or Epilink® or Epilox® curing agents, or polyoxyalkyleneamines, which are available, for example, under the trade name Jeffamine®, or polyethyleneimines, which are available, for example, under the trade name polyimine. Aminosilanes and condensation products thereof are also most preferred. Suitable aminosilanes are, for example, those available under the trade name Geniosil®, such as N-(2-aminoethyl)(3-aminopropyl) trimethoxysilane (Geniosil GF 91), (3-aminopropyl) triethoxysilane (Geniosil GF 93), N-(2-aminoethyl) (3-aminopropyl)methyldimethoxysilane (Geniosil GF 95).

The curing agents may be added, for example, in the form of a liquid, particularly in the form of a powder, to polymer powder compositions, modified with epoxide compounds, that are redispersible in water. If a curing agent is present as a liquid under standard conditions (DIN 50014 23/50), the curing agent is preferably applied to a pulverulent carrier material or encapsulated by means of a protective colloid, for example polyvinyl alcohol, and used in this form.

Conventional pulverulent carrier materials may be used, such as silicon oxides such as silica gel or silica (for example Sipernat® 22), clays, titanium dioxides, calcium carbonate, plastic resins such as silicone resins. The application may be carried out using known methods: the liquid curing agents may be mixed with the pulverulent carrier, which then results in pulverulent particles of carrier coated with curing agent. Highly viscous curing agents may be mixed with the pulverulent carrier material under shear, for example in a Retsch mill, in order to obtain pulverulent carriers coated with curing agent.

For microencapsulation with protective colloid, the curing agents may, for example, be mixed with an aqueous solution of the protective colloid and then the water can be removed, for example by means of roller or spray drying.

The amount of curing agent used generally depends on the molar ratio of the epoxide groups of the epoxide compounds to the functional groups, preferably amino groups, of the curing agent. In general, the epoxide compounds and the curing agents are used in a quantitative ratio such that the molar ratio of epoxide groups of the epoxide compounds to the functional groups of the curing agents is in the range from 0.5 to 2.0.

The crosslinkable polymer powder compositions may additionally comprise one or more reactive diluents, such as glycidyl ethers of mono- or polyhydroxyphenols or aliphatic or cycloaliphatic alcohols. Reactive diluents may be used, for example, in the form of a premix together with the epoxide compounds for producing the crosslinkable polymer powder compositions.

The crosslinkable polymer powder compositions, in particular mixtures of protective colloid-stabilized vinyl ester polymers and epoxide compounds, have glass transition temperatures Tg of preferably −40° C. to +20° C., preferably −30° C. to +10° C. and particularly preferably −20° C. to 0° C. The glass transition temperature Tg of the crosslinkable polymer powder compositions can be determined in a known manner by means of differential scanning calorimetry (DSC). The plot for determining the glass transition temperature Tg of the crosslinkable polymer powder compositions, in particular of the mixtures of the protective colloid-stabilized vinyl ester polymers and epoxide compounds, preferably has one main maximum, in particular only one maximum. The main maximum corresponds to the main glass transition and generally means that the change in the heat capacity at this glass transition is generally greater than, preferably at least three times, more preferably at least six times, even more preferably at least ten times as large as at any other glass transition. The maximum of the curve of the glass transition temperature Tg is preferably in the aforementioned temperature range. This property proved to be advantageous for obtaining the advantageous effects of the present invention.

Aqueous dispersions comprising protective colloid-stabilized vinyl ester polymers and epoxide compounds preferably have similar weight-average particle diameters Dw as the aqueous, protective colloid-stabilized vinyl ester polymer dispersions used for the preparation thereof. This aspect can be quantified by the following quotient Q:

Quotient $Q=Dw(D2)/Dw(D1)$, where

Dw(D2) is the weight-average particle diameter Dw of the aqueous dispersion D2 comprising protective colloid-stabilized vinyl ester polymers and epoxide compounds; and Dw(D1) is the weight-average particle diameter Dw of the protective colloid-stabilized vinyl ester polymer dispersion D1 which was used to prepare the dispersion D2. The weight-average particle diameter Dw is determined by means of a Coulter LS 1320. The quotient Q is preferably ≤5, more preferably ≤4, particularly preferably ≤3 and most preferably ≤2.5. The quotient Q is an indicator of the homogeneity and stability of aqueous dispersions comprising the vinyl ester polymers and epoxide compounds.

The invention further relates to a process for producing the crosslinkable polymer powder compositions according to the invention, by polymerizing one or more vinyl esters by means of free-radically initiated emulsion polymerization or suspension polymerization in water and then drying thereof, wherein ≥51% by weight, based on the total weight of the vinyl ester polymers, of epoxide compounds are added before or during the polymerization or before or during drying.

The polymerization for producing the vinyl ester polymers or the further polymers is generally carried out by the emulsion polymerization process or by the suspension polymerization process, preferably by the emulsion polymerization process, where the polymerization temperature is generally 40° C. to 100° C., preferably 60° C. to 90° C. In the copolymerization of gaseous comonomers such as ethylene, 1,3-butadiene or vinyl chloride, it is also possible to operate under pressure, generally between 5 bar and 100 bar.

The polymerization can be initiated with the water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Examples of monomer-soluble initiators are dicetyl peroxydicarbonate, dicyclohexyl peroxydicarbonate and dibenzoyl peroxide. The initiators specified are generally used in an amount of 0.001% to 0.02% by weight, preferably 0.001% to 0.01% by weight, based in each case on the total weight of the monomers.

Redox initiators used are combinations of the specified initiators in combination with reducing agents. Suitable reducing agents are the sulfites and bisulfites of alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.001% to 0.03% by weight, preferably 0.001% to 0.015% by weight, based in each case on the total weight of the monomers.

Chain transfer agents may be used to control the molecular weight during the polymerization. If such agents are used, they are normally used in amounts of between 0.01 to 5.0% by weight based on the monomers undergoing polymerization and are metered in separately or else premixed with reaction components. Examples of such agents are n-dodecyl mercaptan, tert-dodecyl mercaptan, mercaptopropionic acid, methyl mercaptopropionate, isopropanol, and acetaldehyde.

Suitable protective colloids for the polymerization are, for example, polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, hydroxypropyl derivatives thereof; dextrins and cyclodextrins; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehydesulfonates, naphthalene-formaldehydesulfonates, styrene-maleic acid and vinyl ether-maleic acid copolymers; cationic polymers such as polyDADMAC.

Preference is given to partially hydrolyzed or fully hydrolyzed polyvinyl alcohols having a degree of hydrolysis of 80 to 100 mol %, especially partially hydrolyzed polyvinyl alcohols having a degree of hydrolysis of 80 to 95 mol % and a Hoppler viscosity of 1 to 30 mPas (Hoppler method at 20° C., DIN 53015) in 4% aqueous solution. Preference is also given to partially hydrolyzed, hydrophobically modified polyvinyl alcohols having a degree of hydrolysis of 80 to 95 mol % and a Hoppler viscosity in 4% aqueous solution of 1 to 30 mPas. Examples of these are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of the hydrophobic units is preferably 0.1 to 10% by weight based on the total weight of the partially hydrolyzed polyvinyl alcohol. It is also possible to use mixtures of the polyvinyl alcohols mentioned.

Most preferred are partially hydrolyzed polyvinyl alcohols having a degree of hydrolysis of 85 to 94 mol % and a Hoppler viscosity in 4% aqueous solution of 3 to 25 mPas (Hoppler method at 20° C., DIN 53015). Most preferred are also the partially hydrolyzed polyvinyl acetates having vinyl alcohol units and units of vinyl esters of alpha-branched carboxylic acids having 5 or 9 to 11 carbon atoms in the amounts specified. Examples of such vinyl esters are those which are offered as versatic acid vinyl esters under the names VeoVa®5, VeoVa®9, VeoVa®10 and VeoVa®11. Further most preferred polyvinyl alcohols are partially hydrolyzed, hydrophobized polyvinyl acetates, which are obtained by polymer-analogous reaction, for example acetalization of the vinyl alcohol units with $C_1$- to $C_4$-aldehydes such as butyraldehyde. The proportion of hydrophobic units is preferably 0.1 to 10% by weight based on the total weight of the partially hydrolyzed polyvinyl acetate. The degree of hydrolysis is from 80 to 95 mol %, preferably 85 to 94 mol %, the Hoppler viscosity (DIN 53015, Hoppler method, 4% aqueous solution) from 1 to 30 mPas, preferably 2 to 25 mPas. The protective colloids mentioned are obtainable by processes known to those skilled in the art and, in the polymerization, are generally added in a total amount of 1 to 20% by weight based on the total weight of the monomers.

If polymerization is effected in the presence of emulsifiers, the amount thereof is 1 to 5% by weight, based on the amount of monomers. Preferably no emulsifiers are used. Examples of emulsifiers are anionic, cationic or non-ionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or non-ionic surfactants such as alkyl polyglycol ethers or alkylaryl polyglycol ethers having 8 to 40 ethylene oxide units.

To prepare the dispersion for the polymerization, all of the monomers can be initially charged (batch process), or some of the monomers are initially charged and the remainder metered in (semibatch process).

The epoxide compounds can be added, for example, before and/or during the polymerization to produce the vinyl ester polymers and/or the further polymers and/or before the polymer dispersions obtained therewith are dried. All or some of the epoxide compounds can be initially charged with the preparation water for the polymerization. The epoxide compounds can also be initially charged completely or partially dissolved in monomer. In a further embodiment, all or some of the epoxide compounds can be metered in after initiation of the polymerization. The epoxide compounds are preferably also wholly or partially added to the polymer dispersion during or after any post-polymerization. Particularly preferably, the epoxide compounds are added in whole or in part after completion of the polymerization, in particular after completion of any post-polymerization, to the polymer dispersion thus obtained, in particular before drying thereof. This is advantageous for the cohesion or adhesion properties of the crosslinkable polymer powder compositions applied.

The aqueous dispersions obtainable by the process according to the invention have a solids content of 30 to 75% by weight, preferably 45 to 60% by weight.

To produce the polymer powders redispersible in water or the crosslinkable polymer powder compositions redispersible in water, the aqueous dispersions, optionally after adding protective colloids as drying aid, can be dried in the usual way, for example by means of fluidized bed drying, freeze drying or spray drying. The dispersions are preferably spray-dried. The spray drying is carried out in conventional spray drying systems, in which atomization may be achieved using one-fluid, two-fluid or multifluid nozzles or using a rotating disk. Depending on the system, Tg of the resin and the desired degree of drying, the outlet temperature is generally selected in the range of 45° C. to 120° C., preferably 60° C. to 90° C.

In general, the drying aid is used in a total amount of 3% to 30% by weight. This means that the total amount of protective colloid before the drying process should preferably be at least 3% to 30% by weight; particular preference is given to using 5% to 20% by weight. The figures in % by weight here refer to the total weight of the epoxide compounds, vinyl ester polymers and optionally further polymers present in the dispersion.

Suitable drying aids are, for example, partially hydrolyzed polyvinyl alcohols; polyvinyl pyrrolidones; polyvinyl acetals; polysaccharides in water-soluble form such as starches (amylose and amylopectin), celluloses and carboxymethyl, methyl, hydroxyethyl, hydroxypropyl derivatives thereof; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof, melamine formaldehyde sulfonates, naphthalene formaldehyde sulfonates, styrene maleic acid copolymers and vinyl ether maleic acid copolymers; cationic polymers such as polyDADMAC. Preferably, no protective colloids other than partially hydrolyzed polyvinyl alcohols are used as drying aids.

In many cases, addition of antifoam, in particular of up to 1.5% by weight, based on the vinyl ester polymers and optionally the other polymers, has proven to be favorable, preferably during spraying. To increase the storage stability by improving stability to blocking, particularly in powders having a low glass transition temperature, the resulting powder may be provided with an antiblocking agent (anticaking agent), preferably at up to 30% by weight, based on the total weight of the epoxide compounds, vinyl ester polymers and optionally further polymers. Examples of antiblocking agents are calcium carbonate or magnesium carbonate, talc, gypsum, silica, kaolins, metakaolin, silicates having particle sizes preferably in the range from 10 nm to 10 pm.

The viscosity of the feed to be sprayed is adjusted via the solids content to obtain a value of <500 mPas (Brookfield viscosity at 20 revolutions and 23° C.), preferably <300 mPas. The solids content of the dispersion to be sprayed is >35%, preferably >40%.

To improve the performance properties, further additives may be added during the spraying. Further constituents of dispersion powder compositions contained in preferred embodiments are, for example, pigments, fillers, foam stabilizers, hydrophobizing agents, leveling agents.

Curing agents are preferably added to the powders, particularly preferably immediately after drying the aqueous dispersions. It is also possible to proceed in such a way that the crosslinkable polymer powder compositions are only mixed with curing agent before their application, preferably immediately before their application. It is also conceivable that the crosslinkable polymer powder compositions and pulverulent curing agents are applied separately from each other. For example, in the production of dry mortar compositions, the crosslinkable polymer powder compositions and pulverulent curing agents can be mixed separately from each other, optionally premixed with other formulation constituents.

In the preparation of pasty systems, for example, the procedure can also be such that the crosslinkable polymer powder compositions are mixed with liquid curing agent before application, preferably immediately before application. It is also conceivable that the crosslinkable polymer powder compositions and solid or liquid curing agents are mixed only in the mixing water: for example, liquid curing agents may be added to the mixing water, and the crosslinkable polymer powder compositions and other solid formulation constituents can then be mixed with this mixing water. Or alternatively, first the solid constituents, such as the crosslinkable polymer powder compositions, may be dispersed in the mixing water and then liquid curing agents can be added.

The crosslinkable polymer powder compositions can be used in the areas of application which are typical therefor, for example in construction chemical products, optionally in conjunction with mineral binders such as cements (Portland, high alumina, trass, slag, magnesia or phosphate cement), gypsum and water glass, for the production of construction adhesives, in particular tile adhesives and integrated thermal insulation adhesives, renders, spackling compounds, floor spackling compounds, steam barriers, leveling compounds, sealing slurries, jointing mortars, repair mortars and paints, and furthermore as coating materials or adhesives; or as coating materials or binders for woven and nonwoven textiles and paper.

The formulations for construction chemical products may comprise one or more mineral binders or, alternatively be free of mineral binders. Examples of mineral binders are lime-based binders, in particular hydrated lime or water glass, gypsum and/or preferably hydraulically setting binders, such as cement, in particular Portland, high alumina, trass, slag, magnesia or phosphate cement. Formulations for construction chemical products generally comprise 50% to 80% by weight fillers, such as sand and/or calcium carbonate, and 20% to 50% by weight of the crosslinkable polymer powder composition, based on the dry weight of the formulation. Mineral binders are present to an extent of preferably 0.1% to 40% by weight, more preferably 10% to 30% by weight and particularly preferably 15% to 25% by weight. Alternative formulations preferably comprise <10% by weight, more preferably <9% by weight, even more preferably <5% by weight, particularly preferably <2% by weight and most preferably no cement and/or no mineral binders.

The crosslinkable polymer powder compositions according to the invention are characterized by high reactivity and at the same time by good storage stability, even over a long storage period—and this despite the very high proportion of epoxide compounds in the crosslinkable polymer powder compositions. The redispersibility of the crosslinkable polymer powder compositions is retained in the course of storage. Storage-stable 1-component systems may also be formulated with the crosslinkable polymer powder compositions. Premature crosslinking is counteracted with the provisions according to the invention.

After redispersing the crosslinkable polymer powder compositions in water, rapidly setting crosslinker systems are obtained which result in films with high mechanical strength. Pasty systems produced with the crosslinkable polymer powder compositions have advantageous application properties, such as high curing speeds, flow-promoting, thixotropic or hydrophobizing properties.

Use of crosslinkable polymer powder compositions in the construction sector, for example in adhesive mortars or renders, results in products with high water vapor permeability, pressure resistance, breaking strength or abrasion resistance, after dry or wet storage, even without the addition of mineral binders, or in products with high chemical resistance. Products with high surface hardness are also achievable, which is also desirable for jointing mortars, for example.

The following examples serve to further elucidate the invention:

Production of Aqueous Dispersions Based on Polymers and Epoxy Resins

Example 5

125 kg of an aqueous dispersion of a polyvinyl alcohol-stabilized vinyl acetate-ethylene copolymer (Tg of 14.1° C.; solids content of 58.0%) were initially charged in a reactor of 400 L volume and heated to 70° C. with stirring at 60 rpm.

Then 88.6 kg of the epoxy resin Epilox F17-00 were metered in over 15 minutes. The dispersion thus obtained comprised 55% by weight epoxy resin, based on the dry weight of vinyl acetate-ethylene copolymer and epoxy resin.

Examples 1~4, Examples 6~11 and Comparative Examples 1~3

The dispersions were prepared analogously to Example 5, but with the provisions of Table 1.

Determination of Glass Transition Temperatures Tg for Dispersions or Polymer Powders Based on Polymers and Epoxy Resin:

The glass transition temperatures Tg were determined in accordance with DIN-EN-ISO 11357-2.

A film was produced from the respective dispersion at room temperature overnight. The film was dried under vacuum for 24 hours at room temperature and stored under nitrogen; the glass transition temperature Tg was then determined.

To determine the glass transition temperature Tg on the basis of a powder, the relevant powder was dried under vacuum for 24 hours at room temperature; the glass transition temperature Tg was then determined.

TABLE 1

Dispersions based on polymers and epoxy resin:

| | Polymer[a] | Tg[b] [° C.] | Epoxy resin[c] | Epoxy resin content[d] [wt. %] |
|---|---|---|---|---|
| Ex.1 | VAE | −7.1 | Epilox F17-00 | 55 |
| Ex.2 | VAE | −7.1 | Epilox F17-00 | 66 |
| Ex.3 | VAE | −7.1 | Araldite GY776 | 55 |
| Ex.4 | VAE | −7.1 | Araldite GY776 | 66 |
| Ex.5 | VAE | 14.1 | Epilox F17-00 | 55 |
| Ex.6 | VAE | 14.1 | Epilox F17-00 | 66 |
| Ex.7 | VAE | 14.1 | Araldite GY776 | 55 |
| Ex.8 | VAE | 14.1 | Araldite GY776 | 66 |
| Ex.9 | VAE | 20.4 | Epilox F17-00 | 50 |
| Ex.10 | VAE | 20.4 | Epilox F17-00 | 60 |
| Ex.11 | VAc | 37 | Epilox F17-00 | 57 |
| CEx.1 | Sty/BA | 36.1 | Epilox F17-00 | 38 |
| CEx.2 | Sty/BA | 36.1 | Araldite GY250 | 55 |
| CEx.3 | Sty/BA | −15 | Epilox F17-00 | 50 |

[a]VAE: vinyl acetate-ethylene copolymer; VAc: vinyl acetate homopolymer; Sty/BA: styrene-butyl acrylate copolymer;
[b]Glass transition temperature Tg of the polymers;
[c]Epilox F17-00: bisphenol F type, glass transition temperature Tg: −31.7° C., trade name of Leuna Harze; Araldite GY776: bisphenol A type, glass transition temperature Tg: −23.1° C., trade name of Huntsman; Araldite GY250: bisphenol A type, trade name of Huntsman;
[d]% by weight epoxy resin, based on the dry weight of polymer and epoxy resin.

Investigation of the Stability of the Dispersions Based on Polymers and Epoxy Resin:

The stability of the dispersions was assessed on the basis of their tendency to phase separation using the following qualitative criteria:

Note 1:
no phase separation after 72 hours' storage at room temperature;
Note 2:
extensive phase separation after less than 24 hours at room temperature;
Note 3:
extensive phase separation after less than 12 hours at room temperature.

This test is also used to assess whether the dispersions are suitable for spray drying for the production of powders. Dispersions rated 1 are required for spray drying.

Discussion of the Stability and the Glass Transition Temperatures Tg of the Dispersions of the (Comparative) Examples:

The glass transition temperatures Tg and the assessment of the stability of the dispersions of Examples 1-11 and Comparative examples 1-3 are summarized in Table 2.

The dispersions of inventive Examples 1-11 with vinyl ester polymers gave only one glass transition, whereas the non-inventive Comparative examples 1-3 with styrene-butyl acrylate copolymers resulted in at least two glass transitions.

Testing the stability of the dispersions showed that the styrene acrylate polymer dispersions with high epoxy resin contents according to the invention are so unstable that they are not suitable for spray drying—in contrast to the inventive vinyl ester polymer dispersions of the Examples, which are characterized by high stability.

TABLE 2

Glass transition temperatures Tg and stability of the dispersions:

| | Glass transition temperature Tg [° C.] | Glass transition | Stability |
|---|---|---|---|
| Ex.1 | −17.3 | single stage | 1 |
| Ex.2 | −19.0 | single stage | 1 |
| Ex.3 | −16.5 | single stage | 1 |
| Ex.4 | −18.3 | single stage | 1 |
| Ex.5 | −11.1 | single stage | 1 |
| Ex.6 | −15.9 | single stage | 1 |
| Ex.7 | −9.4 | single stage | 1 |
| Ex.8 | −14.5 | single stage | 1 |
| Ex.9 | −8.7 | single stage | 1 |
| Ex.10 | −14.3 | single stage | 1 |
| Ex.11 | −7.9 | single stage | 1 |
| CEx.1 | −10.8/−7.1 | multi-stage | 2 |
| CEx.2 | −14.3/−0.9 | multi-stage | 3 |
| CEx.3 | −21.6/−6.3 | multi-stage | 3 |

Particle Sizes of Polymers in Dispersions:

The dispersions of Examples 12-16 and Comparative examples 4-6 were prepared analogously to Example 5, but with the provisions of Table 3.

The weight-average particle diameter Dw of the respective polymer dispersion Dw(D1) and of the respective dispersion Dw(D2) comprising polymers and epoxy resin were determined (determination method: Coulter LS 1320).

The quotient of Dw(D2)/Dw (D1) is an indicator of the homogeneity and stability of the dispersion comprising polymers and epoxy resin.

For a dispersion to be particularly suitable for spray drying, the quotient of Dw(D2)/Dw(D1) should preferably be ≤2.5.

Higher ratios can indicate inhomogeneity and instability of the dispersion.

Table 3 summarizes the results. Comparative examples 4-6 show that the aforementioned criterion for the quotient Dw(D2)/Dw (D1) is not met with styrene acrylate polymers and epoxy resin contents according to the invention—in contrast to the dispersions according to the invention with vinyl ester polymers.

TABLE 3

Dispersions based on polymers and epoxy resin:

| | Polymer[a] | Tg[b] [° C.] | Epoxy resin[c] | Epoxy resin content[d] [wt %] | Dw[e] [μm] D1 | Dw[e] [μm] D2 | Dw(D2)/ Dw(D1) |
|---|---|---|---|---|---|---|---|
| CEx. 4 | Sty/BA | 36.1 | Araldite GY250 | 55 | 2.2 | 11.6 | 5.27 |
| CEx. 5 | Sty/BA | 20.5 | Epilox F17-00 | 55 | 3.1 | 26.3 | 8.5 |
| CEx. 6 | Sty/BA | 14 | Epilox F17-00 | 55 | 2.2 | 21.8 | 9.9 |
| Ex. 12 | VAc | 37 | Epilox F17-00 | 66 | 1.3 | 2.8 | 2.2 |
| Ex. 13 | VAE | 14.1 | Epilox F17-00 | 66 | 1.1 | 2.2 | 2.0 |
| Ex. 14 | VAE | 14.1 | Araldite GY776 | 66 | 1.1 | 1.7 | 1.5 |
| Ex. 15 | VAE | 14.1 | Epilox F17-00 | 55 | 1.1 | 1.7 | 1.5 |
| Ex. 16 | VAE | 14.1 | Araldite GY776 | 55 | 1.1 | 1.9 | 1.7 |

[a]VAE: vinyl acetate-ethylene copolymer; VAc: vinyl acetate homopolymer; Sty/BA: styrene-butyl acrylate copolymer;
[b]Glass transition temperature Tg of the polymers;
[c]Epilox F17-00: bisphenol F type, glass transition temperature Tg: −31.7° C., trade name of Leuna Harze; Araldite GY776: bisphenol A type, glass transition temperature Tg: −23.1° C., trade name of Huntsman; Araldite GY250: bisphenol A type, trade name of Huntsman;
[d]% by weight of epoxy resin, based on dry weight of polymer and epoxy resin;
[e]Dw: weight-average particle diameters determined using Coulter LS 1320;
D1: Polymer dispersion;
D2: Dispersion based on polymer and epoxy resin.

Production of Crosslinkable Redispersible Powders (DPP) According to the Invention Example 17

In a reactor of 10 L volume, 2000 g of a 58% aqueous polyvinyl alcohol-stabilized dispersion of a vinyl acetate homopolymer (glass transition temperature Tg 37° C.) were homogenized for 2 hours at 70° C. with 1856 g of the epoxy resin Araldite GY250 (bisphenol A type, trade name of Huntsman).

After cooling to 40° C., 452 g of a 20% aqueous polyvinyl alcohol solution (Hoppler viscosity of 4 mPas, degree of hydrolysis of 88%) and 1856 g of an 11% aqueous polyvinyl alcohol solution (Hoppler viscosity of 13 mPas, degree of hydrolysis of 88%) were added.

To this were also added 7.5 g of the defoamer Surfynol MD20 (trade name of APCI) and 22.6 g of the defoamer Foamstar SI 2213 (based on mineral oil/silicone oil; trade name of BASF).

The dispersion thus obtained had a solids content of 53.7% and a viscosity of 180 mPas (Brookfield 20 RMP, 23° C., spindle 1) and was dried in a cocurrent dryer using a compressed air atomizer at an input temperature of 135° C. and an output temperature of 85° C. with metered addition of 2.5% by weight kaolin, based on organic constituents, as an antiblocking agent.

This gave 2968 g of a colorless, free-flowing powder redispersible in water. The powder was mixed with 10% by weight kaolin, based on organic constituents, as an antiblocking agent.

The powder comprised 50% by weight epoxy resin and 31% by weight vinyl acetate homopolymer, which corresponds to a proportion of 161.3% by weight epoxy resin, based on vinyl acetate homopolymer.

Comparative Example 7

An aqueous, polyvinyl alcohol-stabilized dispersion of a styrene-butyl acrylate copolymer was used (glass transition temperature Tg: 20.5° C.; solids content 52%); otherwise, Comparative example 7 was carried out analogously to Example 17.

A homogeneous, free-flowing powder could not be obtained.

This shows that redispersible polymer powders having a high epoxy resin content are not achievable using styrene-butyl acrylate copolymers.

Examples 18-21 and Comparative Example 8

The crosslinkable redispersion powders of Examples 18-21 and Comparative example 8 were prepared analogously to Example 17, but with the provisions of Table 4.

TABLE 4

Crosslinkable redispersion powders based on polymers and epoxy resin:

| | Polymer[a] | Tg[b] [° C.] | Epoxy resin[c] | Epoxy resin content[d] [wt. %] |
|---|---|---|---|---|
| Ex.17 | VAc | 37 | Araldite GY250 | 61 |
| Ex.18 | VAc | 37 | Epilox F17-00 | 61 |
| Ex.19 | VAc | 37 | Epilox F17-00 | 61 |
| Ex.20 | VAE | 14.1 | Epilox F17-00 | 61 |
| Ex.21 | VAE | −7.0 | Epilox F17-00 | 61 |
| CEx.8 | Sty/BA | 20.5 | Epilox F17-00 | 23 |

[a]VAc: vinyl acetate homopolymer; VAE: vinyl acetate-ethylene copolymer; Sty/BA: styrene-butyl acrylate copolymer;
[b]Glass transition temperature Tg of the polymers;
[c]Epilox F17-00: bisphenol F type, glass transition temperature Tg: −31.7° C., trade name of Leuna Harze; Araldite GY250: bisphenol A type, trade name of Huntsman;
[d]% by weight epoxy resin, based on the dry weight of polymer and epoxy resin.

Discussion of the Crosslinkable Redispersible Powders (DPP):

Comparative example 8 shows that crosslinkable redispersion powders are achievable with styrene acrylate polymers provided that the epoxy resin content is low.

In contrast, crosslinkable redispersion powders based on styrene acrylate polymers and a higher proportion of epoxy resin were not achievable, as shown above with Comparative example 7.

TABLE 5

Glass transition temperatures Tg and stability of the powders of the (comparative) examples:

| Glass transition temperature Tg [° C.] | | Glass transition |
|---|---|---|
| Ex.17 | −6.1 | single stage |
| Ex.18 | −9.8 | single stage |
| Ex.19 | −8.8 | single stage |
| Ex.20 | −11.5 | single stage |
| Ex.21 | −18.2 | single stage |
| CEx.8 | +2.0 | single stage |

Crosslinkable redispersion powders with high proportions of epoxy resin were achievable using vinyl ester polymers (Examples 17-21). The crosslinkable redispersion powders according to the invention (Examples 17-21) all show single-stage glass transitions, as shown in Table 5.

Cement-Free Mortar Formulation and Testing Thereof:

The formulations of the cement-free mortar formulations are specified in Table 6.

The crosslinkable redispersion powders of Example 18 and Comparative example 8 described above were used as redispersion powders (DPP).

In the cement-free mortar formulation of Comparative example 11, the redispersion powder CEx.9 was used. The redispersion powder CEx.9 corresponded to Example 18, with the difference that it did not comprise any epoxy resin.

TABLE 6

Formulations of cement-free mortar formulations:

| | Ex.22 [Wt. %] | CEx.10 [Wt. %] | CEx.11 [Wt. %] |
|---|---|---|---|
| Redispersion powder | | | |
| Ex.18 | 120.0 | | |
| CEx.8 | | 162 | |
| CEx.9 | | | 200 |
| Aradur 3965 [a] | 78 | 69.1 | |
| Melflux 6681F [b] | 0.6 | 0.6 | 0.6 |
| Quartz sand 12 [c] | 604.8 | 604.8 | 578.02 |
| Quartz sand F 32 [d] | 225.4 | 225.4 | 215.38 |
| Natrosol 250 GR [e] | 2.1 | 2.1 | 2.0 |
| Refined hydrated lime [f] | 4.2 | 4.2 | 4.0 |
| Water (total) | 145 | 145 | 145 |

[a] Aradur 3965: aqueous solution (55%), trade name of Huntsman, curing agent;
[b] Dispersant, trade name of BASF;
[c] Filler, sieve line 0.06-0.2;
[d] Filler, sieve line 0.24;
[e] Hydroxyethyl cellulose, trade name of Ashland, thickener;
[f] Ca(OH)$_2$, accelerator.

The cement-free mortar formulations were produced by first combining and homogenizing the powder components in a laboratory mixer.

The curing component Aradur 3965 was added with the mixing water.

The mortar was mixed for one minute with a dissolver with a 6 cm toothed ring at 2000 rpm.

After a resting time of 2 minutes, the mixture was stirred for 15 seconds and placed in shuttering molds. Prisms of dimensions 2*2*4 cm were obtained.

The test specimen from Example 22 could be demolded after just 1 day at room temperature, in contrast the test specimen from Comparative example 11 only after 2 days at room temperature.

The test specimen from Comparative example 10 could not be demolded non-destructively even after 12 days at room temperature, so that determination of the pressure resistance was impossible.

The test specimen from Example 22 showed a significantly higher pressure resistance than the test specimen from Comparative example 11. The pressure resistance was determined on the basis of the test specimens in accordance with DIN EN 12808 Part 3 using 2*2*4 cm prisms. The pressure resistance value relates to the corrected contact area. The test results are summarized in Table 7 (column "after RT curing").

TABLE 7

Test results of test specimens based on cement-free mortar formulations:

| | | Pressure resistance [N/mm$^2$] | |
|---|---|---|---|
| | Demolding [Days] | after RT curing | after crosslinking |
| Ex.22 | 1 | 8 | 25 |
| CEx.10 | 12 | — | 3.2 |
| CEx.11 | 2 | 4.5 | Test specimen deformed, not testable |

Post-Crosslinking Experiments:

For this purpose, the non-demolded test specimens described above of (comparative) Examples 22, 10 and 11 were stored at 120° C. for 12 h. The pressure resistance was then determined in accordance with DIN EN 12808 Part 3 using 2*2*4 cm prisms. The pressure resistance value relates to the corrected contact area. The test results are summarized in Table 7.

The test specimen from Example 22 showed a considerable post-crosslinking effect: the pressure resistance could be increased further by post-crosslinking.

No significant post-crosslinking effect could be achieved for the test specimen from Comparative example 11.

Even after post-crosslinking, the pressure resistance of the test specimen from Comparative example 10 remained dramatically below that of Example 22.

Crosslinkability of Polymer Films

The crosslinkable redispersible powders (DPP) of Example 18, Example 20 and Comparative example 8 were each redispersed in water to form a dispersion with a 50% solids content.

Then the curing agent Epilink 701 (trade name of EVONIK) was mixed according to the molar mixing ratios in Table 8.

Polymer films were produced with the dispersions thus obtained.

After drying, the polymer films were stored as indicated below, and the breaking strengths were then determined in accordance with DIN 53504 (S3a):

7d RT: 7 days storage in air at room temperature;
7d H$_2$O+7d RT: 7 days of storage in water and then 7 days of storage in air at room temperature.

The results are summarized in table 8.

The results show that the inventive crosslinkable redispersion powders of Examples 18 and 20 can be effectively crosslinked after redispersion in water and that the epoxy resin is amenable to crosslinking with amine crosslinkers such as Epilink 701.

It follows from this that in the course of the production and storage of the crosslinkable redispersion powders according to the invention there was no premature crosslinking and the crosslinkable redispersion powders according to the invention are very readily redispersible, despite their high epoxy resin content.

TABLE 8

Test results with crosslinked polymer films:

| Redispersion powders | Molar ratio Epoxide/curing agent | Storage | Breaking strength [MPa] |
|---|---|---|---|
| Ex.20 | 0 | 7d RT | 1.69 |
|  | 0.8 | 7d RT | 10.4 |
|  | 0.8 | 7d H$_2$O + 7d RT | 7.78 |
|  | 1.2 | 7d RT | 14.2 |
|  | 1.2 | 7d H$_2$O + 7d RT | 15.9 |
| Ex.18 | 0 | 7d RT | 2.38 |
|  | 0.8 | 7d RT | 11.8 |
|  | 0.8 | 7d H$_2$O + 7d RT | 10.4 |
|  | 1.2 | 7d RT | 15.8 |
|  | 1.2 | 7d H$_2$O + 7d RT | 15 |
| CEx.8 | 0 | 7d RT | 7.1 |
|  | 0.8 | 7d RT | 10.3 |
|  | 0.8 | 7d H$_2$O + 7d RT | 9.7 |
|  | 1.2 | 7d RT | 9.2 |
|  | 1.2 | 7d H$_2$O + 7d RT | 5.1 |

The invention claimed is:

1. A crosslinkable polymer powder composition redispersible in water, comprising:
   one or more protective colloid-stabilized vinyl ester polymers;
   one or more compounds bearing epoxide groups; and
   optionally one or more curing agents which crosslink with the one or more compounds bearing epoxide groups,
   wherein the one or more protective colloid-stabilized vinyl ester polymers do not comprise any epoxide-functional monomer units,
   and the crosslinkable polymer powder composition redispersible in water comprises ≥51% by weight, based on the total weight of the one or more protective colloid-stabilized vinyl ester polymers, of the one or more compounds bearing epoxide groups and
   wherein a mixture of the one or more protective colloid-stabilized vinyl ester polymers and the one or more compounds bearing epoxide groups has a glass transition temperature Tg of −40° C. to +20° C., determined by differential scanning calorimetry,
   wherein the crosslinkable polymer powder composition redispersible in water does not comprise an emulsifier.

2. The crosslinkable polymer powder composition of claim 1,
   wherein one or more epoxy resins are present as the one or more compounds bearing epoxide groups.

3. The crosslinkable polymer powder composition of claim 1,
   wherein 55 to 300% by weight of the one or more compounds bearing epoxide groups are present, based on the total weight of the one or more protective colloid-stabilized vinyl ester polymers.

4. The crosslinkable polymer powder composition of claim 1,
   wherein that 20 to 75% by weight of the one or more compounds bearing epoxide groups are present, based on the total weight of the crosslinkable polymer powder composition redispersible in water.

5. The crosslinkable polymer powder composition of claim 1,
   wherein the one or more protective colloid-stabilized vinyl ester polymers are based on ≥50% by weight of vinyl esters, based on the total weight of the one or more protective colloid-stabilized vinyl ester polymers.

6. The crosslinkable polymer powder composition of claim 1,
   wherein one or more protective colloid-stabilized vinyl ester polymers are selected from the group comprising vinyl ester homopolymers, copolymers of vinyl acetate with ethylene, copolymers of vinyl acetate with ethylene and one or more further vinyl esters, copolymers of one or more vinyl esters, vinyl chloride and ethylene and copolymers of vinyl acetate with ethylene and one or more acrylic esters.

7. The crosslinkable polymer powder composition of claim 1,
   wherein 15 to 75% by weight of the one or more protective colloid-stabilized vinyl ester polymers are present, based on the total weight of the crosslinkable polymer powder composition.

8. The crosslinkable polymer powder composition of claim 1,
   wherein the crosslinkable polymer powder composition has a glass transition temperature Tg in the range of −40° C. to +20° C., determined by differential scanning calorimetry, and the plot for determining the glass transition temperature Tg only has one maximum.

9. A process for producing the crosslinkable polymer powder composition of claim 1, comprising:
   polymerizing the one or more protective colloid-stabilized vinyl esters by means of free-radically initiated emulsion polymerization or suspension polymerization in water and then drying thereof,
   wherein ≥51% by weight, based on the total weight of the one or more protective colloid-stabilized vinyl esters, of the one or more compounds bearing epoxide groups are added before or during the polymerization or before or during drying.

10. The process of claim 9, wherein the one or more compounds bearing epoxide groups are added wholly or partially during or after post-polymerization or wholly or partially after completion of the polymerization or wholly or partially before drying.

11. A tile adhesive, comprising the crosslinkable polymer powder composition of claim 1.

12. An integrated thermal insulation adhesive, comprising the crosslinkable polymer powder composition of claim 1.

13. A render, comprising the crosslinkable polymer powder composition of claim 1.

14. A spackling compound, comprising the crosslinkable polymer powder composition of claim 1.

15. A steam barrier, comprising the crosslinkable polymer powder composition of claim 1.

16. A levelling compound, comprising the crosslinkable polymer powder composition of claim 1.

17. A sealing slurry, comprising the crosslinkable polymer powder composition of claim 1.

18. A mortar, comprising the crosslinkable polymer powder composition of claim 1.

19. A coating, comprising the crosslinkable polymer powder composition of claim 1.

20. A binder for textiles and paper, comprising the crosslinkable polymer powder composition of claim 1.

* * * * *